(12) United States Patent
Amtmann

(10) Patent No.: US 6,563,882 B1
(45) Date of Patent: May 13, 2003

(54) WRITE/READ DEVICE FOR COMMUNICATION WITH TRANSPONDERS, HAVING FIRST CODING MEANS AND SECOND CODING MEANS

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/315,708

(22) Filed: May 20, 1999

(30) Foreign Application Priority Data

May 22, 1998 (EP) ............................................. 98890149

(51) Int. Cl.[7] .............................................. H04L 27/04
(52) U.S. Cl. ...................................................... 375/295
(58) Field of Search ................................. 375/295, 259, 375/369, 377; 340/505, 10.1, 10.3, 10.51, 825.77; 342/42, 51

(56) References Cited

U.S. PATENT DOCUMENTS

| | | | | |
|---|---|---|---|---|
| 4,047,151 A | * | 9/1977 | Rydbeck et al. | 375/243 |
| 4,851,849 A | * | 7/1989 | Albersdoefer | 342/201 |
| 5,546,420 A | * | 8/1996 | Seshadri et al. | 370/342 |
| 5,825,299 A | * | 10/1998 | Fuentes et al. | 340/10.42 |

* cited by examiner

Primary Examiner—Tesfaldet Bocure
(74) Attorney, Agent, or Firm—Michael J. Ure

(57) ABSTRACT

A write/read device (1) for the contactless communication with at least one transponder has a first encoder (4) for coding a data block (DB) in accordance with a first coding method, which first encoder (4) can generate at the most a given number of N coding signals (KI) per data block (DB) in accordance with this first coding method, and has a second encoder (9) for coding a data block (DB) in accordance with a second coding method, which second encoder (9) can generate at the most a given number of M coding signals (KI) per data block (DB) in accordance with this second coding method, and has a selection circuit (10) for the selection between the coding signals (KI) supplied by the first encoder (4) and the coding signals (KI) supplied by the second encoder (9).

6 Claims, 2 Drawing Sheets

WRITE/READ DEVICE FOR COMMUNICATION WITH TRANSPONDERS, HAVING FIRST CODING MEANS AND SECOND CODING MEANS

BACKGROUND OF THE INVENTION

The invention relates to a write/read device designed for the contactless communication with at least one transponder and comprising data supply means for supplying at least one data block and including first coding means, by which first coding means a data block supplied by the data supply means and applied to said first coding means can be coded in accordance with a first coding method and by which, as a result of the coding in accordance with this first coding method, at the most a given number N of coding signals representing a data block can be generated and supplied, and including carrier signal generating means for generating a carrier signal and including modulation means, to which modulation means the carrier signal and the coding signals can be applied and by which modulation means the carrier signal can be modulated in accordance with the coding signals so as to generate and supply a modulated carrier signal corresponding to the number of coding signals and having the same number of modulation steps, and including transmission means, to which transmission means the modulated carrier signal can be applied in order to be transmitted to at least one transponder.

Such write/read device is commercially available in a variety of versions and is consequently known. The known write/read device includes coding means adapted to perform a bit-oriented coding method, wherein for coding a data block a given number N of bits can be coded, i.e. each bit can exhibit either the logic zero state or the logic one state, so that as a result of coding in accordance with this bit-oriented coding method at the most a given number N of coding signals, i.e. coding pulses, which represent a data block can be generated. Such a bit-oriented coding method has the advantage that a component high transmission rate is attainable. However, such a coding method entails the problem that corresponding to each coding signal a modulation step occurs in the carrier signal, which is amplitude-modulated in the known write/read device, as a result of which during the transmission from the write/read device to a transponder not only the amplitude-modulated carrier signal has a comparatively high amplitude but that, in addition, the amplitudes in the so-called sidebands may exhibit comparatively large values if many modulation steps occur, which in many countries gives rise to problems as regards statutory regulations relating to spurious emission and the limitation of spurious emission.

SUMMARY OF THE INVENTION

It is an object of the invention to preclude the afore-mentioned problems in a write/read device and to provide an improved write/read device during whose use no problems arise as regards statutory regulations relating to spurious emission and the limitation of spurious emission. According to the invention this object is achieved in a write/read device of the type defined in the opening paragraph in that there have been provided second coding means, by which second coding means a data block supplied by the data supply means and applied to said second coding means can be coded in accordance with a second coding method and by which second coding means, as a result of coding in accordance with said second coding method, at the most a given number M of coding signals representing a data block can be generated and supplied, the number M being smaller than the number N, and there have been provided selection means with the aid of which it is possible to select that the coding signals representing a data block and supplied by the first coding means or that the coding signals representing a data block and supplied by the second coding means can be applied to the amplitude modulation means. By means of the measures in accordance with the invention it is achieved in a very simple manner and with only minimal additional cost that in a write/read device in accordance with the invention it is possible to choose from two coding possibilities or coding methods, so that it is possible either to select a coding method in which high amplitudes can occur in the range of the sidebands but which has the advantage that it guarantees high transmission rates, i.e. a transmission which is as rapid as possible, or to select another coding method which only allows a lower transmission rate, i.e. a slower transmission, but which has the advantage that it guarantees particularly small amplitude values in the range of the sidebands, thereby ensuring that problems as regards statutory regulations relating to maximum permissible spurious emissions and the limitation of spurious emission are avoided.

In a write/read device in accordance with the invention the measures defined in claim 3 have proved to be advantageous because it is thus the desired result is obtained with a minimal number of modulation steps in the modulated carrier signal per coded data block, which guarantees particularly small amplitude values in the range of the sidebands.

Various possibilities are available for the implementation of the selection means in a write/read device in accordance with the invention. However, it has proved to be particularly advantageous if the measures defined in claim 4 are taken because this has appeared to be particularly favorable for implementation by means of a microcomputer.

The measures defined in claims 5 and 6 have proved to be very advantageous because they guarantee that in a transponder which communicates with a write/read device in accordance with the invention the coding method selected for the data transmission in the write/read device can be detected very simply and thus a correct decoding is guaranteed in the transponder.

The afore-mentioned as well as further aspects of the invention will become apparent from the example of an embodiment described hereinafter and will be elucidated with reference to this example.

BRIEF DESCRIPTION OF THE DRAWING

The invention will be described in more detail with reference to the drawings, which show two embodiments given by way of example, to which the invention is not limited.

DESCRIPTION OF THE PREFERRED EMBODIMENTS

Figure 1:
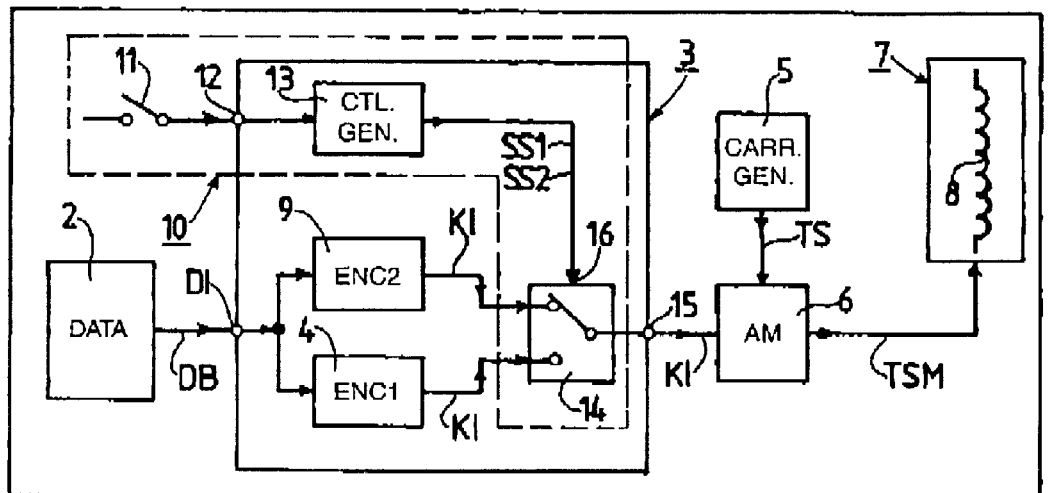
FIG. 1 is a block diagram of a relevant part of a write/read device in accordance with a first embodiment of the invention.

FIG. 1 shows a write/read device 1, hereinafter briefly referred to as the device 1. The device 1 is designed for the contactless communication with a plurality of transponders, as is known since long.

Figures 2A, 2B, 2C:
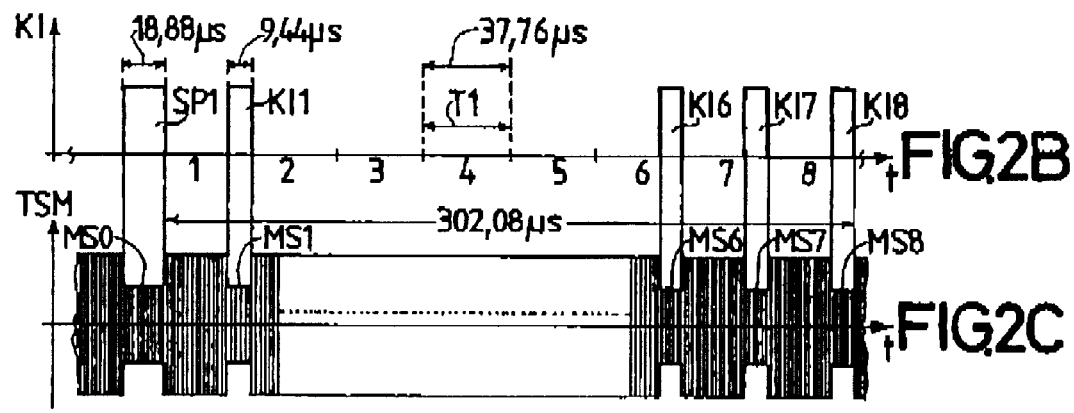
FIG. 2A shows an example of a data block which occurs in the device of FIG. 1.
FIGS. 2B to 2E show signals and signal waveforms which occur in the device of FIG. 1 as a result of the data block shown in FIG. 2A.

The device 1 includes data supply means 2, which in the present case are formed by a memory. However, the data supply means 2 may alternatively be formed by other means, for example by data generation means which generate and supply data in response to information applied to these means. The data supply means 2 are adapted to supply at least one data block DB. Such a data block DB can be formed by, for example, the data block E1 hex=225 dec, as shown in FIG. 2A. This data block can be represented in a binary manner by means of one byte if eight bits in total. The following description is based on this example. However, it is to be noted that in the case that a data block corresponding to a decimal number having far more digits, this has the consequence that a binary representation of this block is possible only by means of a plurality of bytes having eight bits.

The device 1 includes a microcomputer 3 by means of which a multitude of means and functions are realized but in the present case only the relevant means will be described in more detail.

The first coding means 4 are implemented by means of the microcomputer 3. The first coding means 4 make it possible to code a data block DB, which is supplied by the data supply means 2 and is applied to the first coding means 4 via a data input DI of the microcomputer 3, in accordance with a first coding method. The data input DI is shown as a serial input but it can also take the form of a parallel input. The first coding means 4 are adapted to carry out a bit-oriented coding method. In the present case the first coding means 4 are adapted to perform a coding method in accordance with a Return-To-Zero code. As a result of the coding in accordance with this first coding method the first coding means 4 can generate and supply at the most a number N of coding signals representing a data block DB. In the present case the number N has the value N=8 and the coding signals are formed by coding pulses KI, as can be seen in FIG. 2B.

In the case that the first coding means 4 receive a data block DB corresponding to the decimal number "225" (225 dec) from the data supply means 2, the first coding means 4 supply a total of coding pulses KI, as is shown in FIG. 2B, namely the coding pulses KI1, KI6, KI7 and KI8. In this respect it is to be noted that the coding pulse KI1 corresponds to the value $2^0$, a coding pulse KI2 to the value $2^1$, a coding pulse KI3 to the value $2^2$, a coding pulse KI4 to the value $2^3$, a coding pulse KI5 to the value $2^4$, the coding pulse KI6 to the value $2^5$, the coding pulse KI7 to the value $2^6$, and the coding pulse KI8 to the value $2^7$. Each of these coding pulses KI has a duration of 9.44 $\mu$s. The coding pulses KI are situated in a time frame comprising eight time frame portions, which each have a frame portion time T1 of 37.76 $\mu$s. The coding pulses KI each time appear at the end of a frame time portion.

As regards the first coding means 4 it is to be noted that these means 4 are adapted to generate a first start signal SP1 which identifies the first coding method and which is supplied by the first coding means 4 before the coding signals KI which represent a data block, the number of coding signals being at the most equal to the given number N=8. The first start signal SP1 has a duration of 18.88 $\mu$s. This duration of 18.88 $\mu$s of the first start signal SP1 is characteristic of the first coding method that can be carried out by the first coding means 4. Similarly to the coding pulses KI, the first start signal SP1 appears at the end of a time frame portion.

The device 1 further includes carrier signal generating means 5 for generating a carrier signal TS, which in the present case is a carrier signal having a frequency of 13.56 MHz.

The device 1 further includes modulation means, which in the present case are formed by amplitude modulation means 6. The amplitude modulation means 6 are arranged to receive the carrier signal TS and the coding signals, i.e. the coding pulses KI. With the aid of the amplitude modulation means 6 the carrier signal TS can be modulated in accordance with the coding pulses KI, so as to generate and supply an amplitude-modulated carrier signal TSM having a number of modulation steps MS equal to the number of coding pulses KI.

In the present case in accordance with FIGS. 2A and 2B a total of four modulation steps occur in the amplitude-modulated carrier signal TSM, which are referenced MS1, MS6, MS7 and MS8 in FIG. 2C. Similarly to the coding pulses KI, the modulation steps MS are each time situated at the end of a frame time portion and advantageously occupy only half the duration of a frame time portion, which is favorable in view of minimal amplitude values in the range of the sidebands of the amplitude-modulated carrier signal TSM. The modulation step in the amplitude-modulated carrier signal TSM which corresponds to the first start signal SP1 bears the reference MS0. The modulation depth is represented only diagrammatically in FIG. 2C. In practice, it is advantageous to use a 10% amplitude modulation (ASK 10%). However, it is alternatively possible to use an ASK of 20%, an ASK of 30% or an ASK of 50%.

As is further apparent from fog 2C, the amplitude-modulated carrier signal TSM corresponding to the data block DB=225 dec requires a transmission time of 302.08 $\mu$s. This means that the transmission of this amplitude-modulated carrier signal TSM and thus the transmission of the data word DW=225 dec from the device 1 to a transponder which communicates with the device 1 requires only a comparatively short length of time. However, owing to the occurrence of, in the present case, four modulation steps MS1, MS6, MS7 and MS8 within the transmission time interval of 302.08 $\mu$s comparatively high amplitude values will occur in the range of the sidebands of the carrier signal TS. If all the eight modulation steps MS1 to MS8 occur the maximum amplitude values are reached in the range of the sidebands of the carrier signal TS.

The device 1 finally comprises transmission means 7, which include a transmission coil 8. The transmission means 7 are arranged to receive the amplitude-modulated carrier signal TSM. The transmission means 7 transmit the amplitude-modulated carrier signal TSM inductively to receiving means of a transponder which is in communication with the device 1.

The device 1 advantageously includes second coding means 9 with the aid of which a data block DB supplied by the data supply means 2 and applied to the second coding means 9 can be coded in accordance with a second coding method. The second coding means 9 are adapted to carry out a byte-oriented coding method. In the present case the second coding means 9 are adapted to carry out a coding method in accordance with a "1-out-of-K" code. Owing to the coding in accordance with this second coding method the second coding means 9 can generate and supply at the most a given number M of coding signals which represent a data block DB, the number M being smaller than the number N. In the present case this second coding method enables at the most the given number M=1 of coding signals which represent a data block DB to be generated and supplied and the second coding means 9 supply coding signals in the form of coding pulses KI, as is apparent from FIG. 2D.

Figures 2D, 2E:
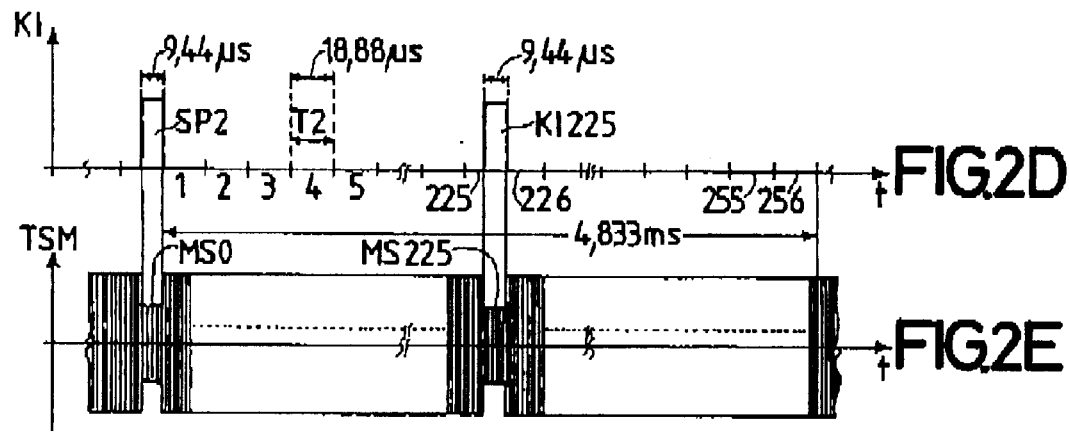

As is further apparent from FIG. 2D, the second coding means 9 in the present example, in which the data block DB=225 dec shown in FIG. 2A, supply a single coding pulse KI225. The coding pulse KI225 is situated in a time frame comprising 256 time frame portions, which each have a frame portion time T2 of 18.88 µs. The coding pulse KI225 is situated in the 225th time frame portion, namely in such a way that it lies at the end of this time frame portion and continues till the end of this time frame portion. The coding pulse KI225 has a duration of 9.44 µs, which corresponds to half the frame portion time T2 and which also applies to all the other possible coding pulses KI1 to KI256. The coding pulse KI225 which can be supplied by the second coding means 9 corresponds to one byte comprising eight (8) bits, namely the byte "10000111", corresponding to the coding pulses KI1, KI6, KI7 and KI8 which can be supplied by the first coding means 4.

As regards the second coding means 9 it is to be noted that the second coding means 9 are adapted to generate a second start signal SP2 which is characteristic of the second coding method, which start signal—as can be seen in FIG. 2D—is supplied by the second coding means 9 before the coding signals which represent a data block, i.e. the coding pulse KI225, the number of coding signals being at the most equal to the given number M=1.

With respect to the coding means 9 it is to be noted further that the second coding means 9 can be designed so as to guarantee that a given data block DB, preferably the data block that occurs most frequently and which for example corresponds to the decimal value zero, is coded in that for this data block DB no coding signal at al, i.e. no coding pulse KI, is generated and supplied, as a result of which no modulation step at all is generated for this data block DB. This measure is advantageous in view of a reduction of the sideband level in conjunction with a so-called quasi-peak measurement.

The device 1 further includes selection means 10 which make it possible to select that either the coding signals KI representing a data block DB and supplied by the first coding means 4 or the coding signals KI representing a data block DB and supplied by the second coding means 9 can be applied to the amplitude modulation means 6.

In the present case the selection means 10 include a control switch 11, which is controllable by hand but which also be controllable in another manner. The control switch 11 has one end connected to a potential, not indicated, and has its other end connected to an input 12 of the microcomputer 3. Arranged after the input 12 are control signal generating means 13, which are realized by means of the microcomputer 3 and which generate two different control signals SS1 and SS2 in dependence on the switching state of the control switch 11. When the control switch 11 is in its non-conductive switching state the control signal generating means 13 generate the first control signal SS1, while in the conductive switching state of the control switch 11 said means generate the second control signal SS2.

The selection means 10 further include controllable switching means 14 arranged between, on the one hand, the first coding means 4 and the second coding means 9 and, on the other hand, an output 15 of the microcomputer 3, to which output the amplitude modulation means 6 are connected. This means that the switching means 14 are included, on the one hand, the first coding means 4 and the second coding means 9 and, on the other hand, the amplitude modulation means 6.

When the control switch 11 is in its switching state shown in FIG. 1 and, consequently, the control signal generating means 13 supply the first control information SS1 to the control input 16 of the switching means 14, this results in the switching means 14 being in the switching state shown in FIG. 1, in which state the second coding means 9 are connected to the amplitude modulation means 6.

When the second coding means 9 are connected to the amplitude modulation means 6 via the switching means 14 this results in the pulse train shown in FIG. 2D being applied to the amplitude modulation means 6, as a result of which the amplitude-modulated carrier signal TSM shown in FIG. 2E is generated, in which only one modulation step, namely the modulation step referenced MS225, occurs after the modulation step MS0 initiated by the second start signal SP2.

As can be seen in FIG. 2E, the transmission of the amplitude-modulated carrier signal TSM corresponding to the data block DB=225 dec shown in FIG. 2A requires a total transmission time of 4.833 µs owing to the frame portion time T2 of 18.88 µs. In comparison with the transmission time of 302.08 µs in FIG. 2 this is a substantially longer transmission time but in relation to the amplitude-modulated carrier signal TSM shown in FIG. 2 it is to be noted that in the time interval of 4.833 µs only a single modulation step occurs, namely the modulation step MS225, which has the advantageous result that the amplitude values in the range of the sidebands of the carrier signal TS are particularly small, so that no problems arise with statutory regulations relating to the effects of spurious emission and the limitation of spurious emission.

The device 1 described hereinbefore advantageously allows a choice between two coding methods, so that at option either a coding method can be selected in which comparatively high amplitudes occur in the range of the sidebands of the carrier signal but which in an advantageous manner guarantees high transmission rates, i.e. a rapid transmission from the device to a transponder, or another coding method can be selected, which only permits a lower transmission rate, i.e. a slower transmission but which in an advantageous manner guarantees particularly small amplitude values in the range of the sidebands of the carrier signal.

Figure 3:
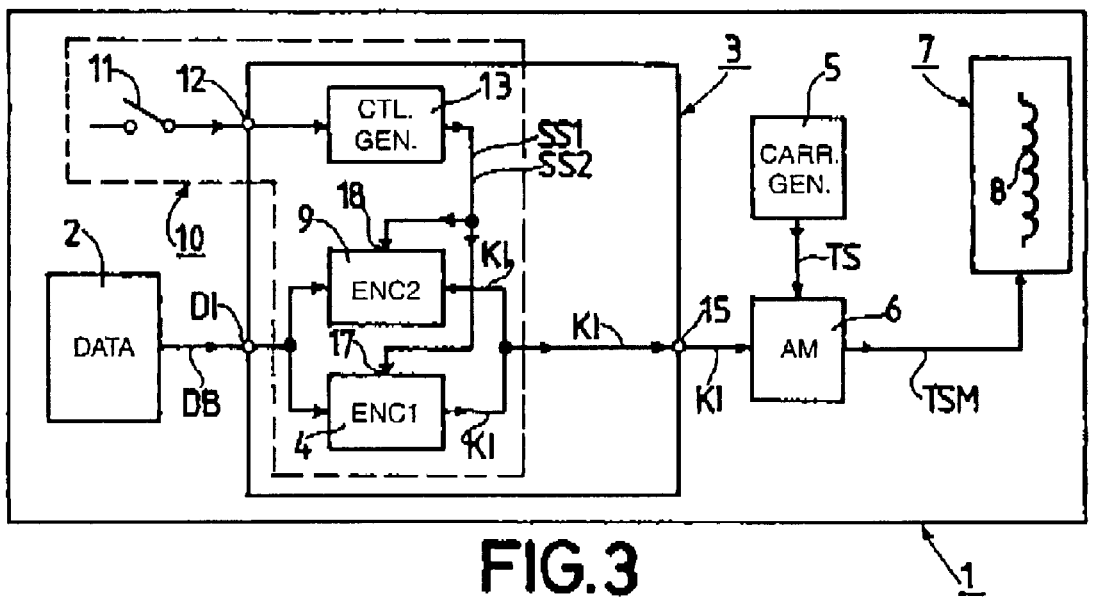
FIG. 3 shows a write/read device in accordance with a second embodiment of the invention.

The device 1 shown in FIG. 3 differs from the device 1 shown ia FIG. 1 in that it has selection means 10 by means of which it is possible to select whether the coding pulses KI supplied by the first coding means 4 or by the second coding means 9 are transferred to the amplitude modulation means 6.

In the device 1 shown in FIG. 3 the selection means 10 also include the first coding means 4 and the second coding means 9. In the present case, the first coding means 4 and the second coding means 9 each have a control input 17 and 18, respectively, which are arranged to receive the control signals SS1 and SS2 supplied by the control signal generating means 13. Both coding means 4 and 9 are designed in such a manner that in the case that the first control signal SS1 is applied to the control inputs 17 and 18 of the two coding means 4 and 9 the first coding means 4 are set to an inactive state and the second coding means 9 are set to an active state, while in the case that the second control signal SS2 is applied to the control inputs 17 and 18 of the two coding means 4 and 9 the first coding means 4 are set to an active state and the second coding means 9 are set to an inactive state. Thus, it is also achieved that when the control switch 11 is in its non-conductive state the second coding means 9 supply the coding pulses KI generated by them to the amplitude modulation means 6 and when the control switch 11 is in its conductive state the first coding means 4 supply the coding pulses KI generated by them to the amplitude modulation means 6. With regard to the two devices 1 described hereinbefore it is to be noted that in the case that for the transmission of data supplied by the data supply means 2 not a single data block is used—as described hereinbefore for the sake of simplicity—but that a data block sequence comprising a plurality of data blocks is required for this, which sequence for example consists of n data blocks, the relevant coding means 4 or 9 only generate a start signal SP1 or SP2 before the first data block of each of such data block sequences.

The invention is not limited to the devices in accordance with the two embodiments described hereinbefore by way of example. When this is appropriate the second coding means may also be adapted to carry out a coding method in accordance with a "2-out-of-K" code or a "4-out-of-K" code. Moreover, when the first coding means are active a comparatively low amplitude of the carrier signal may be selected, in which case only a comparatively small transmission range can be obtained but it is also achieved that low amplitudes can be obtained in the range of the sidebands of the carrier signal. Furthermore, it is to be noted that, if desired, a device in accordance with the invention may also include third coding means with the aid of which a third coding method can be carried out in order to apply coding signals coded in accordance with a third coding method to the amplitude modulation means for the purpose of amplitude modulation of the carrier signal. It is to be noted that instead of amplitude modulation means other modulation means may be used, for example frequency modulation means or phase modulation means, enabling for example frequency shift keying or phase shift keying, for example by 180°, to be carried out.

What is claimed is:

1. A write/read device (1) designed for the contactless communication with at least one transponder and comprising data supply means (2) for supplying at least one data block (DB) and including first coding means (4), by which first coding means (4) a data block (DB) supplied by the data supply means (2) and applied to said first coding means (4) can be coded in accordance with a first coding method and by which, as a result of the coding in accordance with this first coding method, at the most a given number N of coding signals (KI) representing a data block (DB) can be generated and supplied, and including carrier signal generating means (5) for generating a carrier signal (TS) and including modulation means (6), to which modulation means (6) the carrier signal (TS) and the coding signals (KI) can be applied and by which modulation means (6) the carrier signal (TS) can be modulated in accordance with the coding signals (KI) so as to generate and supply a modulated carrier signal (TSM) corresponding to the number of coding signals (KI) and having the same number of modulation steps, and including transmission means (7), to which transmission means (7) the modulated carrier signal (TSM) can be applied in order to be transmitted to at least one transponder, characterized in that there have been provided second coding means (9), by which second coding means (9) a data block (DB) supplied by the data supply means (2) and applied to said second coding means (9) can be coded in accordance with a second coding method and by which second coding means (9), as a result of coding in accordance with said second coding method, at the most a given number M of coding signals representing a data block (DB) can be generated and supplied, the number M being smaller than the number N, and there have been provided selection means (10), with the aid of which selection means (10) it is possible to select that the coding signals (KI) representing a data block (DB) and supplied by the first coding means (4) or that the coding signals (KI) representing a data block (DB) and supplied by the second coding means (9) can be applied to the amplitude modulation means (6).

2. A device (1) as claimed in claim 1, characterized in that the second coding means (9) are adapted to carry out a byte-oriented coding method.

3. A device (1) as claimed in claim 2, characterized in that the second coding means (9) are adapted to carry out a coding method in accordance with a "1-out-of-K" code.

4. A device (1) as claimed in claim 1, characterized in that the selection means (10) include switching means (14) arranged between, on the one hand, the first coding means (4) and the second coding means (9) and, on the other hand, the modulation means (6).

5. A device (1) as claimed in claim 1, characterized in that the first coding means (4) are adapted to generate a first start signal (SP1) characteristic of the first coding method, which start signal can be supplied by the first coding means (4) before the coding signals (KI) representing a data block (DB), the number of these coding signals being at the most equal to the given number N.

6. A device (1) as claimed in claim 1, characterized in that the second coding means (9) are adapted to generate a second start signal (SP2) characteristic of the second coding method, which start signal can be supplied by the second coding means (9) before the coding signals (KI) representing a data block (DB), the number of these coding signals being at the most equal to the given number M.

* * * * *